UNITED STATES PATENT OFFICE.

ROBERT E. LYONS, OF BLOOMINGTON, INDIANA.

PROCESS OF RECOVERING NATIVE PLATINUM METALS.

1,126,646.  Specification of Letters Patent.  Patented Jan. 26, 1915.

No Drawing. Application filed November 19, 1914. Serial No. 872,912.

*To all whom it may concern:*

Be it known that I, ROBERT E. LYONS, a citizen of the United States, residing at Bloomington, in the county of Monroe and State of Indiana, have invented certain new and useful Improvements in Processes of Recovering Native Platinum Metals, of which the following is a specification.

This invention relates particularly to the recovery of platinum in its native state, either pure or in combination with other metals, as found in natural deposits of material, such as black sand, or placer gravel, and in various other kinds of deposit.

The invention broadly as applied to the recovery of platinum and other metals such as rusty gold is set forth and claimed in my co-pending application, Serial Number 801,514, filed November 17, 1913, and this application is a continuation of said application and relates specifically to the recovery of platiniferous metals which characteristically will not normally amalgamate with mercury through direct contact of the mercury and the platinum.

Heretofore many attempts have been made to recover native platinum metals which are found in relatively large quantities in various localities. Various electrolytic processes have been employed in which metallic mercury was used as a cathode but such processes are expensive and the combination with the mercury is not permanent. It is also well known that sodium amalgam will wet platinum and that the platinum will adhere so long as sodium is present in the mercury but sodium amalgam disintegrates rapidly and completely in water and the process of recovery by this method is both expensive and unsatisfactory.

I have discovered that under suitable conditions native platinum can be recovered from gangue by forming at ordinary temperature a combination or alloy of platinum and another metal, which alloy is capable of amalgamation with mercury and so yielding an amalgam which is permanent under the ordinary working conditions employed for the separation and removal of gangue. This is accomplished by subjecting the platinum in a bath of suitable substance to the action of the alloying metal in the presence of mercury, causing an alloy or combination between the platinum and the other metal whereby permanent amalgamation of the alloy can be effected.

In carrying out my process the material containing the particles of platinum is subjected to the action of an amalgam comprising a metal capable of alloying with the platinum at temperatures under 100° centigrade, such as zinc, in a bath or solution of a suitable acid such as sulfuric acid, which is capable of keeping the surface of the amalgam clean and of causing the generation of hydrogen in considerable quantities when such alloying metal is brought into contact with the platinum particle. Preferably the zinc is employed in the form of zinc amalgam since the action of the acid upon such amalgam is relatively slow until it is brought into contact with the particle when hydrogen is evolved almost as rapidly with the amalgam as with metallic zinc. The mercury may serve as a carrier for the zinc to bring it into more intimate contact with the particle than otherwise, and the presence of mercury seems also to facilitate the alloying power or action of the zinc upon platinum. The zinc amalgam is brought into contact with the native platinum in the presence of the solution, whereby a zinc alloy is formed with the platinum which then readily amalgamates with the excess of zinc amalgam or with the mercury contained in the zinc amalgam. The hydrogen which is evolved when the platinum is brought into contact with the zinc or zinc amalgam probably tends to cleanse the surface of the platinum and permits the alloying process to take place more rapidly and effectively than otherwise.

Although I refer particularly to zinc in carrying out my improved process, it is obvious that certain other metals, such for example as bismuth or zinc-bismuth alloys may be used instead of metallic zinc. It will also be obvious however that copper and similar metals cannot be used in place of zinc since copper does not alloy with platinum or gold at ordinary temperatures nor do copper and such metals permit the evolution of sufficient hydrogen to enable my process to be carried out.

Various well known methods may be employed to bring the particle of platinum into contact with the zinc and mercury or the zinc amalgam in the presence of the proper solution and therefore need not be described. Preferably the materials are thoroughly mixed by tumbling the same in a suitable barrel or cylinder. The zinc or other amalgam may be formed before being placed in the amalgamator or the zinc, mercury and solution may be added separately to the pulp and the amalgam formed through rotation or agitation of the materials. Preferably also sufficient mercury is added to produce a relatively soft and fluid or flowing amalgam. The strength of the solution varies with the material used and to some extent with the conditions of use but I have found in practice that a solution of one to three per cent. of sulfuric acid is satisfactory under ordinary working conditions. The quantity of zinc required also varies with the conditions of use it being necessary to have sufficient zinc to maintain continuous reaction until amalgamation is completed and so that the zinc will not be entirely exhausted or dissolved from the amalgam by the acid. Ordinarily a one per cent. zinc amalgam will give satisfactory results if the mercury and zinc are relatively clean and the resulting amalgam is removed from the reaction mixture before the zinc is exhausted or dissolved. Instead of sulfuric acid, other suitable agents, for example, hydrochloric acid may be substituted with satisfactory results.

It is obvious that various changes in the strength of the solution and in the nature of the materials and the manner of combining the same which are within the knowledge of those skilled in the art may be made without departing from the spirit of my invention, provided the method set forth in the following claims be employed.

What I claim as my invention is:

1. The process of recovering particles of platiniferous metal which consists in subjecting said particles to the action of zinc and mercury in the form of an amalgam and a solution capable of attacking the zinc to generate hydrogen, forming an alloy between said particles and zinc and then amalgamating said alloy.

2. The process of recovering particles of platiniferous metals which consists in subjecting them to the action of mercury and a metal capable of alloying with the platinum at ordinary temperatures and a substance capable of attacking said alloying metal, and forming an alloy between said metal and said particles and then amalgamating said alloy.

3. The process of amalgamating particles of platiniferous metals which consists in subjecting said particles to the action of an amalgam, of a metal capable of alloying with the platinum and a solution capable of attacking the alloying metal to generate hydrogen, forming an alloy with the platinum and then amalgamating said alloy.

4. The process of amalgamating particles of platiniferous metals which consists in subjecting said particles to the action of an amalgam containing zinc and a solution of an acid capable of attacking the zinc to generate hydrogen, forming an alloy between the said particles, and a portion of the zinc contained in said amalgam and then amalgamating said alloy.

Signed at Bloomington, in the county of Monroe, and State of Indiana this 16th day of November, A. D. 1914.

ROBERT E. LYONS.

Witnesses:
NOBLE C. CAMPBELL,
U. H. SMITH.